(12) United States Patent
Tan

(10) Patent No.: US 6,310,131 B1
(45) Date of Patent: Oct. 30, 2001

(54) RECONFIGURABLE TOOLING AND METHOD OF MANUFACTURE

(76) Inventor: Seng C. Tan, 3591 Apple Grove Dr., Beavercreek, OH (US) 45430

( * ) Notice: Subject to any disclaimer, the term of this patent is extended or adjusted under 35 U.S.C. 154(b) by 0 days.

(21) Appl. No.: 09/519,185

(22) Filed: Mar. 6, 2000

(51) Int. Cl.$^7$ ....................................................... C08K 3/00
(52) U.S. Cl. ........................................... 524/445; 524/425
(58) Field of Search ..................................... 524/425, 445

(56) References Cited

U.S. PATENT DOCUMENTS 4,146,525 * 3/1979 Stradley .............................. 260/29.2

* cited by examiner

Primary Examiner—Edward J. Cain

(57) ABSTRACT

According to the present invention there are provided compositions and tooling useful in the fabrication of composite structures and prepared from compositions that are mixtures of elastomeric and ceramic materials that can be tailored to obtain desired mechanical properties or thermal expansion coefficients. The compositions and tooling prepared therefrom are inexpensive and easy to fabricate and reconfigure. Such compositions generally comprise blends of clays that harden at elevated temperatures, clays that soften at elevated temperatures and uncured silicone rubbers that exhibit high temperature stability. Compositions comprising from about 5% to about 60% by weight of uncured silicone rubber, from about 20% to about 80% by weight of a clay that hardens at elevated temperature and from about 5% to about 50% by weight of clays that soften at elevated temperatures are specifically preferred. Inert filers that do not adversely affect the mechanical or thermal expansion coefficients of the inventive compositions such as mica, calcium carbonate etc. may also be included.

20 Claims, No Drawings

RECONFIGURABLE TOOLING AND METHOD OF MANUFACTURE

FIELD OF THE INVENTION

The present invention relates to reconfigurable tooling for the fabrication of composite structures from materials such as resins, fibers and fillers. More particularly the present invention relates to compositions/mixtures of materials suitable for the inexpensive fabrication of molds, mandrels etc. for the fabrication of such structures.

BACKGROUND OF THE INVENTION

In the fabrication of so-called composites for use in the aircraft and aerospace industry, tooling and assembly costs are major drivers. Conventional tooling for the fabrication of composites generally has a fixed geometry and is very costly to manufacture. Additionally, such current tooling may have short lifetimes and demonstrate inappropriate shrinking characteristics.

Aluminum is the most popular tooling material for low volume production, up to 100 parts, whereas steel is the first choice for volumes over about 100 parts. For the creation of master patterns, plaster is the most popular material followed by wood, modeling board and aluminum. Invar (iron-nickel) has been used to some extent in the aerospace industry because of a good match of thermal expansion coefficients with those of graphite/epoxy materials. This tooling material is, however, very expensive and requires significant lead times for machining. As a result, significant effort has been applied in developing CAD software to reduce the time needed for tooling design to shorten the overall prototype or product fabrication cycle. To the best of our knowledge, there have been no breakthroughs in tooling materials, techniques or approaches in the last decade.

The above problems are especially acute in the fabrication of mandrels. Commonly used techniques for the fabrication of this tooling include the use of: nylon bagged styrofoam cores; solid metal mandrels; soft inflatable bladders; hollow silicone mandrels; thermoplastic mandrels; machined foam flyaway; and water soluble substances such as eutectic salts. In the use of such systems, depending upon that used, demolding and materials costs are significant problems. As a consequence, most mandrels are machined from solid pieces of material such as aluminum or cast into a fixed shape and cannot be easily reconfigured.

Accordingly, the availability of relatively low cost tooling that is reconfigurable and readily and cheaply fabricated would be of significant value to the aircraft and aerospace industries in the fabrication of composite structures.

OBJECTS OF THE INVENTION

It is therefore an object of the present invention to provide compositions suitable for the relatively inexpensive manufacture of tooling for composite fabrication.

It is another object of the present invention to provide composite fabrication tooling, molds and mandrels, prepared from such compositions.

SUMMARY OF THE INVENTION

According to the present invention there are provided compositions and tooling useful in the fabrication of composite structures and prepared from compositions that are mixtures of elastomeric and ceramic materials that can be tailored to obtain desired mechanical properties or thermal expansion coefficients. The compositions and tooling prepared therefrom are inexpensive and easy to fabricate and reconfigure. Such compositions generally comprise blends of clays that harden at elevated temperatures, clays that soften at elevated temperatures and uncured silicone rubbers that exhibit high temperature stability. Compositions comprising from about 5% to about 60% by weight of uncured silicone rubber, from about 20% to about 80% by weight of a clay that hardens at elevated temperature and from about 5% to about 50% by weight of clays that soften at elevated temperatures are specifically preferred. Inert filers that do not adversely affect the thermal expansion coefficients of the inventive compositions such as mica, calcium carbonate etc. may also be included.

DETAILED DESCRIPTION OF THE INVENTION

Improving the cycle time and reducing the fabrication costs of composite structures have been long term goals in the aerospace industry for many years. Much of the cost associated with such manufacture relates to the time, processes and materials used to fabricate the tooling, molds, dies and mandrels, used to fabricate composite products. Most efforts to reduce such costs in recent years have been aimed at the development of improved software, CAD products, to improve and thereby shorten the design segment of the process. Little effort has been directed to the development of improved tooling materials that allow shortening of the tooling manufacturing cycle and reduction of the manufacturing cost that remain two of the major hurdles facing composites in mass production.

The present invention addresses the high cost of manufacture of composite structures by describing a class of compositions compounded from relatively low cost materials, which compositions are easily, and cheaply fabricated into tooling and are readily reconfigurable when changes must be made. The compositions, their method of manufacture and tooling made therefrom are all described herein.

The tooling compositions of the present invention comprise blends of 1) an elastomeric material; 2) clay that hardens at elevated temperatures; and 3) clay that softens at elevated temperatures. The compositions can be loaded with a variety of fillers that enhance their mechanical and thermal properties, i.e. thermal expansion coefficients.

Tooling for the fabrication of composite structures preferably exhibits coefficients of thermal expansion (CTE's) somewhat higher than those of the composite materials being cured or processed (above about 6.18 m/m/° C.) so as to be able to provide sufficient support for consolidation. Accordingly, the compositions of the present invention exhibit CTEs above this level. Materials such as silicone rubber, mica, calcium carbonate and quartz all exhibit these CTEs and accordingly can be used as fillers in the compositions of the present invention. Additionally, silicon oxide, ceramic powders and chopped ceramic fibers that exhibit these characteristics can also be used as fillers.

Preferred compositions include mixtures or blends of: 1) cured or uncured silicone rubber, filled or unfilled with, for example mica; 2) a clay that hardens at elevated temperatures such as a structural clay; and 3) a clay that softens at elevated temperatures such as a modeling or styling clay. In this mixture, the elevated temperature hardening clay provides the mechanical properties required in tooling used at elevated temperatures but too high a percentage thereof yields a mixture that does not soften and therefore cannot be or are very difficult to reconfigure. The modeling or high temperature softening clay remains soft and therefore workable or reconfigurable at high and low or ambient temperatures. The elastomeric uncured silicone rubber exhibits very good thermal stability, and serves as a binder for the other constituents of the composition. Alone silicone rubber does not provide the mechanical properties demanded of a good tooling material Preparation of the blends or mixtures of the present invention is achieved by chopping the constituents into relatively fine particles such as a powder to enhance blending and blending using, for example, a roll mill or an extruder. With a roll mill, several passes may be necessary to achieve homogeneity, while with an appropriate extruder, blending can generally be obtained in a single pass.

Highly preferred compositions are those comprising from about 5% to about 60% uncured silicone rubber, from about 20% to about 80% structural clay and from about 5% to about 50% modeling or styling clay. Mica, calcium carbonate and other thermally stable materials may be added as fillers as long as the coefficients of thermal expansion remain within the prescribed limits.

It is important in that the product composition not contain more than about 5% by weight of water. Hot rolling or extruding at temperatures up to about 220° C. will remove excess moisture in the blending step. If blending is performed at a temperature less than about 150° C., for example at room temperature, the composition must be dried to a moisture level below about 5% by weight at a temperature at or below about 220° C. prior to shaping into tooling as described below.

Any suitable technique can be used to shape the compositions just described into useful tooling, mandrels etc. The compositions of the present invention can be cast to net or near net shape using conventional wood or metal dies or cast into blocks and then "machined" to the desired shape. Casting can be accomplished at room temperature by placing the composition in the metal or wood die and consolidating using a hydraulic press. Removal of the thus shaped composition is easily accomplished.

The reconfigurable tooling thus fabricated can be used in a variety of composite fabrication techniques including autoclave and liquid injection (out-of auto-clave) molding. Care must be exercised that the mechanical properties of the tooling are adequate for the pressure and temperature conditions of the fabrication process. As will be seen from the examples below, a wide range of shapes can be fabricated using tooling made from the compositions described herein.

EXAMPLES

The following examples will serve to better demonstrate the successful practice of the invention.

Example 1

A reconfigurable tooling material was blended using uncured silicone rubber, modeling clay and structural clay in a ratio of 27.8%: 27.8%: 44.4% by weight by blending in a commercial blender for about 30 minutes or until the mixture appeared homogeneous in color. The uncured silicone rubber was Airtech 4140 supplied by Airtech International, 5700 Skylab Rd., Huntington Beach, Calif. 92647. The structural clay was Marblex supplied by American Art Clay Co. Inc., 16055 Heron Ave., LaMirada, Calif. 90638 and the modeling clay is commonly available at any pottery store.

These materials were blended in a commercial blender for from 30 to 60 minutes or until the mixture had a relatively uniform appearance. The material was dried in an oven at 122° C. for six hours and the weight loss of the material measured. Subsequent drying did not remove significant amounts of moisture under these conditions. At the end of this cycle, moisture content was less than 4% by weight. Thermal mechanical analysis was then performed for 2–3 typical composite forming cycles. The CTE during the first heating cycle was measured at 128 $\mu$m/m/° C. and decreased to 121 $\mu$m/m/° C. during the second heating cycle. The curve remained constant during the third heating cycle. The material had a relatively constant CTE over a broad range of temperature indicating that it is dry. Thermal mechanical analysis indicated that the material was stable to temperatures over 250° C.

Cube shaped samples of from about 0.5" to about 0.7" were cut from the material using a sharp knife and then compression loaded between the parallel platens of a hydraulic Instron test machine. At room temperature, the material indicated linear performance up to about 200 psi and then started to yield. Testing at 60% applied strain indicated no catastrophic failure. The stress strain relationship at 250° F. indicated that the material softened somewhat probably due to the non-uniformity observed in the sample. A uniform sample of this formulation is projected to have a yield strength of about 80 psi at 250° F. No catastrophic failure was observed up to 60% applied strain.

Example 2

A second sample of the same composition as that in Example 1 was blended and oven dried at 220° C. for 30 minutes. Thermal mechanical analysis indicated that the material still contained a small amount of moisture. Subsequent thermal mechanical analyses were again performed while composite fabrication cycling three times at 250° C. The ratio of dimensional change versus temperature remained essentially constant for the second and third cycles.

Example 3

Using the same formulation as in Example 1, a mandrel shape that is used to fabricate a hat-shaped composite structure in a conventional autoclave process was formed. Batches of the formulations were blended and pressed into blocks about 0.82" thick and oven dried at 220° C. for four hours. Thermal mechanical analysis was performed for two heating cycles. This material exhibited a CTE of 142 $\mu$m/m/° C. indicating that it probably still contained excess moisture. This finding demonstrates that it takes a longer time to dry the compositions of the present invention in the compressed state in thicker sections.

Example 4

To demonstrate that the mechanical properties of the compositions of the present invention can be tailored to various desired levels, the composition of Example 1 was subjected to a variety of heat treatments. In this case, the materials were blended using a roll mill at room temperature. After several passes, the material in sheet form, appeared very homogeneous in color suggesting that it was blended homogeneously. These blended sheets were heat treated in an oven at 220° C. for different lengths of time, 1, 2, and 4.5 hours. The sheets were then easily ground into powders using a commercial grinder and compression molded into the desired shapes at room temperature. Subsequent compression tests at room temperature showed that their elastic limits are 375, 389 and 664 psi respectively, corresponding to the 1, 2, and 4.5 hour heat treatments. Their elastic limits under compression at 250° F. are 135, 210 and 320 psi respectively. The compression molded blocks could be easily reground and reshaped into the same or different shapes.

Different heat treatment conditions result in different CTEs. The above-mentioned heat treatments yielded CTEs of 303, 156 and 177 $\mu m/m/°$ C. respectively. These values reamined stable over at least three heating cycles.

Example 5

The same composition as that described in Example 1 was heat treated at 150° C. for 1 and 2 hours. Compression testing using cubical samples about 0.65–0.75 inches in each dimension was then performed. The yield strength of material subjected to these treatments was 405 and 354 psi respectively at room temperature, 133 and 90 psi respectively at 250° F. and their CTEs were 289 and 393 $\mu m/m/°$ C. respectively. These values suggest that the materials still contained some residual moisture.

Example 6

Another composition comprising high temperature sealant material, modeling clay and structural clay in a ratio 27.8%: 27.8% :44.4% by weight was pressed into a disc and oven dried at 122° C. for six hours. The resulting thermal mechanical analysis indicated that the CTE decreased to 8.91 $\mu m/m/°$ C. after three heating cycles. This CTE is identical to that of composite structures fabricated by a wet lay-up technique. The lower CTE value is apparently due to the different constituent materials and lower moisture content.

Example 7

An integrated hat-shaped composite structure was fabricated using a mandrel made from a composition similar to that described in Example 1. A trapezoidal shape was machined form aluminum to provide the die. The blend of Example 4 was put inside of the die cavity that had previously been covered with a thin aluminum foil or Teflon™ sheet to facilitate release. The die was then covered with an aluminum plate and closed with a hydraulic press. Conventional carbon fabric/epoxy prepeg lay-up techniques were used to form the hat-shaped section. A vacuum of about 23–24.5 in. Hg was drawn for about 15 minutes after every five to eight layers of prepeg were placed in the mold. A vacuum of 25 in. Hg was applied during curing for two hours at 200° F. and a heat up rate of about 3–4° F. per minute. The hat shape was then cooled to room temperature. The reconfigurable mandrel was then easily removed from the cavity by hand as opposed to removal with significant force that would be required if the mandrel were metal.

The hat-shaped composite structure exhibited dimensional and mechanical properties (tensile, stress-strain etc.) virtually identical to those of similar conventionally autoclave produced composite structures.

Samples have also been prepared using an autoclave to produce similar structures with similar results.

Example 8

In order to examine the reusability of the tooling, the mandrel used in Example 7 was cut up and recast into the same trapezoidal shape. This shape was the used to fabricate the same hat structure in an autoclave. The results were the same thus proving the reusability of the compositions of the present invention.

There have thus been described a family of compositions that are useful for the fabrication of tooling for the fabrication of composite structures which compositions are inexpensive, rapidly formed and easily reconfigurable. These compositions will significantly shorten the composite fabrication cycle time while concurrently significantly reducing the cost thereof.

As the invention has been described, it will be apparent to those skilled in the art that the same may be varied in many ways without departing from the spirit and scope of the invention. Any and all such modifications are intended to be included within the scope of the appended claims.

What is claimed is:

1. A composition for the fabrication of tooling for the formation of composite structures comprising:
   a) an elastomer or uncured rubber;
   b) clay that hardens at elevated temperatures; and
   c) clay that softens at elevated temperatures.

2. The composition of claim 1 having a moisture content below about 5% by weight.

3. The composition of claim 2 having a coefficient of thermal expansion above about $6.18 \times 10^{-6}$ m/m/° C.

4. The composition of claim 3 wherein said clay that hardens at elevated temperatures is structural clay and said clay that softens at elevated temperatures is modeling clay.

5. The composition of claim 4 comprising from about 5% to about 60% by weight of said elastomer, from about 20% to about 80% of said structural clay and from about 5% to about 50% of said modeling clay.

6. The composition of claim 1 further including filler that does not adversely affect the mechanical or thermal expansion coefficients of said compositions.

7. The composition of claim 6 wherein said filler is selected from the group consisting of mica, silicon oxide, calcium carbonate and ceramic powders and chopped fibers.

8. Reconfigurable tooling for the fabrication of composite structures comprising:
   a) an elastomer or uncured silicone rubber;
   b) clay that hardens at elevated temperatures; and
   c) clay that softens at elevated temperatures.

9. The reconfigurable tooling of claim 8 having a moisture content below about 5% and a coefficient of thermal expansion above about $6.18 \times 10^{-6}$ m/m/° C.

10. The reconfigurable tooling of claim 9 wherein said clay that hardens at elevated temperatures is structural clay and said clay that softens at elevated temperatures is modeling clay.

11. The reconfigurable tooling of claim 10 comprising from about 5% to about 60% by weight of said elastomer, from about 20% to about 80% of said structural clay and from about 5% to about 50% of said modeling clay.

12. The reconfigurable tooling of claim 11 further including filler that does not adversely affect the mechanical or thermal expansion coefficients of said compositions.

13. The reconfigurable tooling of claim 12 wherein said filler is selected from the group consisting of mica, silicon oxide, calcium carbonate and other ceramic powders and chopped fibers.

14. A method for the production of reconfigurable tooling for the fabrication of composite structures comprising:
   a) blending a mixture of:
      1) an elastomer;
      2) clay that hardens at elevated temperatures; and
      3) clay that softens at elevated temperatures to form a homogeneous mixture;
   b) drying said homogeneous mixture to a moisture level below about 5%; and d) forming said homogeneous mixture into a suitable tooling shape.

15. The method of claim 14 wherein said drying is accomplished by heating at a temperature below about 220° C. for a period greater than about 30 minutes.

16. The method of claim 14 wherein said tooling shape has a coefficient of thermal expansion above about $6.18 \times 10^{-6}$ m/m/° C.

17. The method of claim 14 wherein said clay that hardens at elevated temperatures is structural clay and said clay that softens at elevated temperatures is modeling clay.

18. The method of claim 17 wherein said mixture comprises from about 5% to about 60% by weight of said elastomer, from about 20% to about 80% of said structural clay and from about 5% to about 50% of said modeling clay.

19. The method of claim 17 wherein said mixture further includes a filler that does not adversely affect the mechanical or thermal expansion coefficients of said compositions.

20. The method of claim 17 wherein said filler is selected from the group consisting of mica, silicon oxide, calcium carbonate and other ceramic powders and shopped fibers.

* * * * *